July 18, 1950  
G. A. LYON  
2,515,243  
METHOD OF AND MEANS FOR FORMING EXTRUDED PLASTIC SHEETS  
Filed Dec. 2, 1946  
2 Sheets-Sheet 2
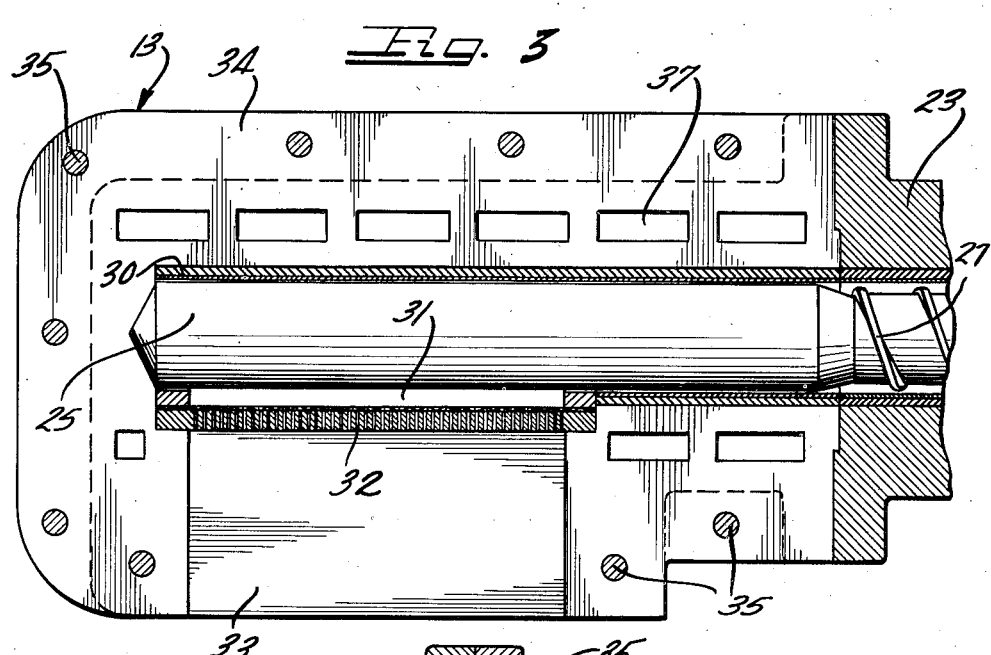
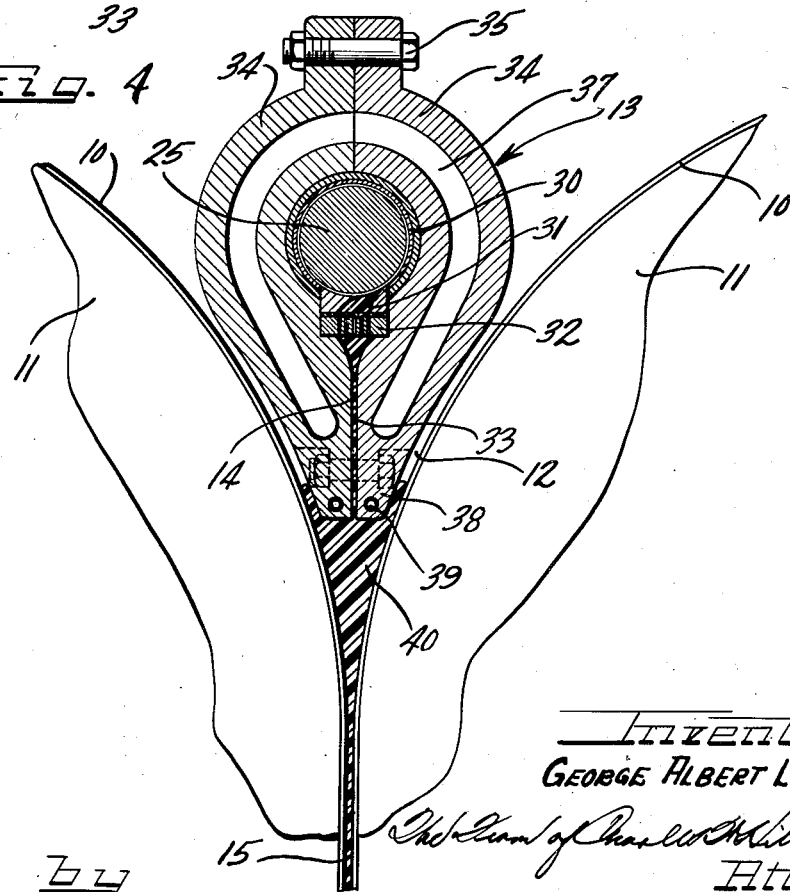
Inventor  
GEORGE ALBERT LYON Patented July 18, 1950

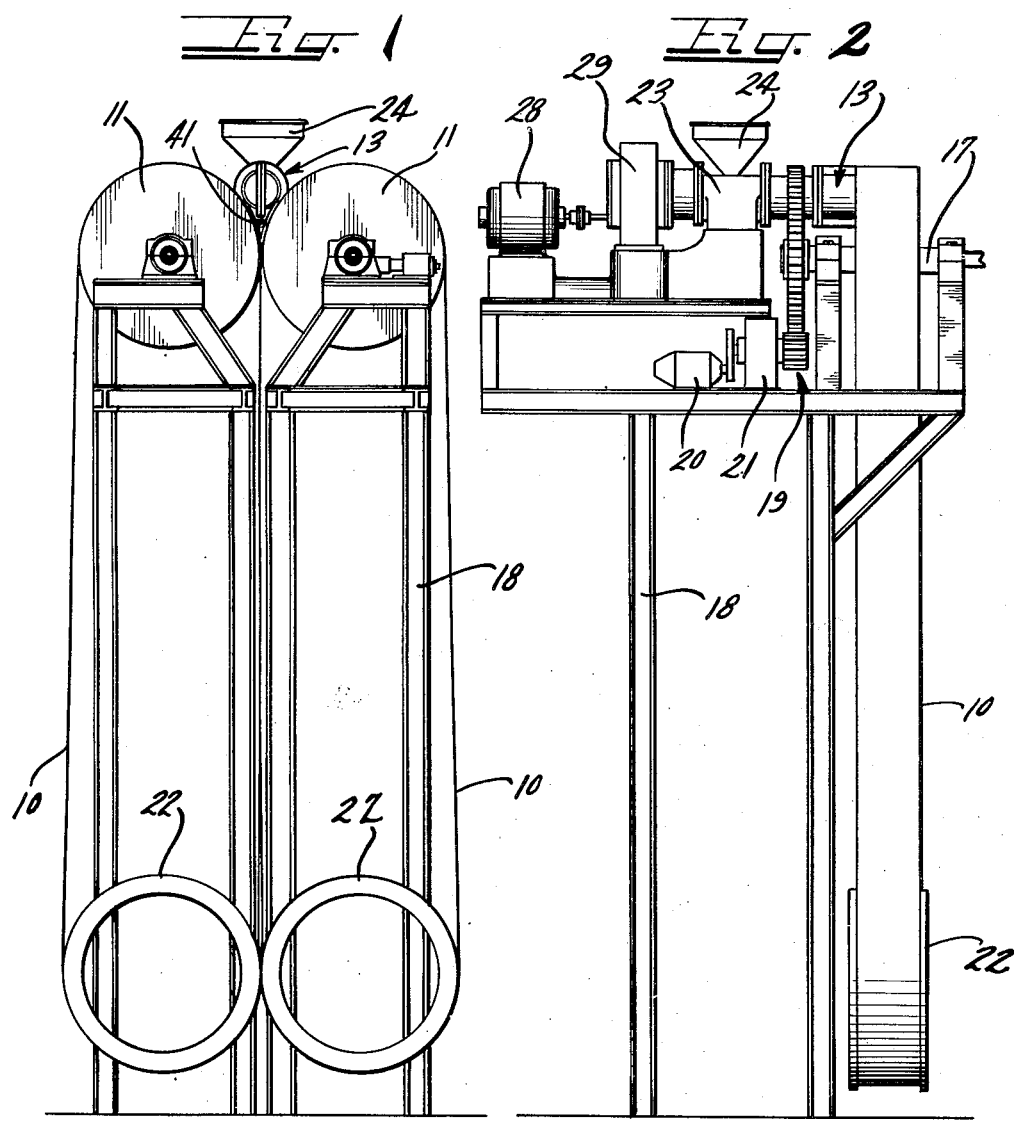

2,515,243

UNITED STATES PATENT OFFICE 2,515,243

METHOD OF AND MEANS FOR FORMING EXTRUDED PLASTIC SHEETS

George Albert Lyon, Allenhurst, N. J.

Application December 2, 1946, Serial No. 713,514

9 Claims. (Cl. 18—15)

This invention relates to the forming of synthetic plastic material into sheet form, and more particularly concerns an improved method of and means for the continuous formation of plastic sheet.

One of the major problems in the manufacture of plastic material into sheet form is the avoidance of air bubbles or pockets in the completed plastic sheet. Since the fluid plastic material is quite viscous it inherently tends to entrap air and form air bubbles or pockets while being carried over from the fluid plastic source or outlet such as a nozzle to the point where the plastic enters the sheet-forming surfaces. When this air remains entrapped, it results in the finished sheet being pocked or having bubbles greatly diminishing the usefulness of the sheet and for the most part causing it to be scrapped as waste.

Accordingly, it is an important object of the present invention to avoid the entrapment of air in in fluid plastic formed into sheets.

Another object of the invention is to provide a high speed method of forming synthetic plastic material into sheet form free from imperfections caused by entrapped air.

A further object of the invention is to provide an improved method of supplying fluid plastic to a plastic sheet forming apparatus in a manner to be free from detrimental exposure to the atmosphere.

According to the general features of the present invention there is provided a method of forming plastic sheet according to which fluid plastic material is delivered between opposed traveling forming surfaces by extruding a stream of the fluid plastic between the surfaces from a nozzle which is so disposed that it would normally be subject to the surrounding atmosphere at least at its outlet, but about which outlet a dam of the fluid plastic material is maintained to exclude the atmosphere from the extruded plastic jet or stream to the point where the plastic stream is completely engaged between the forming surfaces.

Further according to the general features of the invention there is provided a method of forming plastic sheet which comprises extruding the plastic in a fluid state from a nozzle immersed in a mass of the fluid plastic at the convergence of opposed traveling forming belts for continuously forming the fluid plastic into a sheet.

According to additional features of the invention the improved method of forming plastic sheet comprises extruding a fluid plastic material downwardly from a nozzle having its outlet within an upwardly opening trough from which the fluid plastic is carried downwardly between moving sheet forming surfaces, and controlling the rate of extrusion of the material from the nozzle to maintain a head of the fluid plastic material in the trough in excess of actual sheeting requirements and high enough to completely and continuously immerse the outlet of the nozzle and thereby providing a complete barrier effectively excluding atmosphere from the outlet and the plastic material leaving the trough between the forming surfaces.

According to still further general objects of the invention there is provided apparatus for forming plastic material into sheets including convergently disposed, continuously running sheet forming belts with a plastic extrusion nozzle extending into the convergence of the belts but spaced from the belts and from the actual point of closest convergence, and means such as retainer plates close the ends of the space between the discharge end of the nozzle and the point of belt-convergence for retaining an atmosphere-excluding dam or head of plastic material in such space.

Other objects, features and advantages will be readily apparent from the following detailed description of a preferred embodiment of the invention taken in conjunction with one form of apparatus adapted for the practice of the improved method and which is illustrated in the accompanying drawings in which:

Figure 1 is a front view of a continuous plastic forming machine wherein my improved method is practiced;

Figure 2 is a left side elevational view of the machine;

Figure 3 is an enlarged longitudinal vertical sectional view through the delivery nozzle end of the plastic extruder of the machine; and Figure 4 is a transverse vertical sectional view through the extruder nozzle and the immediately adjacent portions of the forming equipment showing how the extruder nozzle projects downwardly into an upwardly opening trough formed above the converging forming surfaces.

As shown on the drawings:

My improved method will be best understood by reference to the illustrated exemplary form of apparatus by which the method is adapted to be practiced. Described in general terms, the plastic sheet forming apparatus includes sheet forming surfaces provided by a pair of cooperable endless, continuously traveling forming belts 10 which run over closely peripherally spaced pressing rolls 11 disposed on parallel horizontal axes and defining an outwardly and, in the present instance, upwardly opening trough 12 at the convergence thereof into which projects a fluid-plastic extrusion nozzle 13. Heated, fluid plastic material 14 is extruded from the nozzle 13 into the trough 12 in such a manner that the extruded plastic is engaged between the forming belts 10 traveling in unison downwardly away from the nozzle by rotation of the rolls 11 in opposite directions, the plastic being squeezed into plastic sheet form as indicated at 15 and setting while traveling between the forming run of the belts.

Having reference to Figs. 1 and 2, each of the rolls 11 is carried by a shaft 17 suitably journalled in bearings on a framework 18 and driven through a train of meshing gears, indicated generally at 19. A motor 20 drives the gear train 19 through a reduction gearing 21. The drums or rolls 11 may be hollow and heated in any suitable manner as for example by means of steam.

The forming belts 10 are made from suitable material such as stainless steel and are endless in form, being suspended from the driving and pressing rolls 11 and are suitably weighted at their lower ends by respective weighting rolls 22 which are of larger diameter than the driving rolls 11. Thereby the opposing plastic sheet forming runs of the belts are forced together until they separate upon running about the weighting rolls 22 and release the formed plastic sheet 15 for independent onward travel.

The plastic extruding nozzle 13 forms part of an extruding unit 23 carried by the framework 18 and having a hopper 24 into which the plastic material is dumped for introduction into the extruder. Operating within the extruder 23 and projecting into the nozzle 13 is a so-called torpedo rod 25 for advancing the plastic material mix introduced through the hopper 24 and equipped for this purpose with spiral fins 27. The torpedo rod 25 is driven rotatably by means of a motor 28 operating through a reduction gearing 29 (Fig. 2) coupled to the rear end of the torpedo rod.

Within the nozzle structure 13, a polished tubular liner 30 surrounding the torpedo rod 25 in concentric slightly spaced relation has an elongated downwardly directed discharge opening 31 from which the plastic issues through a perforated breaker plate structure 32 into a discharge passage or orifice 33.

In a preferred form, the nozzle structure 13 comprises a two part construction including complementary separable half-shell sections 34 which may be secured together by means of bolts 35 and are complementally hollow as indicated at 37 to provide a steam jacket for heating the plastic mix to the proper state of fluidity for extrusion. The orifice 33 is thus provided by shallow complementary offsets in the opposing wall of the nozzle sections 34. The length of the orifice 33 is such as to afford a good distribution of the plastic into the trough 12, the orifice opening downwardly through tapering lips 38 adapted to project relatively deeply into the trough 12 but having the tips thereof spaced above the point of maximum convergence of the belts 10. The nozzle lips 38 have the outer sides thereof formed on respective, complementary concave radii to lie in uniformly spaced relation to the adjacent curving portions of the belts 10 where the latter pass over the rollers 11. At the point the plastic 14 issues from the outlet or orifice 33 it may be subject to suitable heating by means such as electric coils 39 disposed within the lower extremity portions of the tapering lips 38.

According to the present invention, the plastic 14 is delivered into the trough 12 and enters between the forming surfaces of the belts 10 to the effective exclusion of all air which might become trapped in the viscous stream of plastic material issuing from the orifice 33 in the space between the lower tip of the nozzle and the point of complete pressure engagement of the plastic between the forming belt 10 at the point of closest peripheral proximity of the rollers 11. This is accomplished by maintaining a head 40 of plastic material in the bottom of the trough 12 and extending high enough to maintain the tip of the nozzle and in particular the orifice 33 immersed in the plastic mass. This forms an effective dam or barrier against the atmosphere reaching to the plastic material which passes from the orifice 33 to the forming belts 10.

To retain the plastic head 40 within the trough 12 respective end plates 41 are carried by the nozzle 13 to close off the ends of the trough 12. The end plates 41 are, of course, of a complementary shape at their edges to the convergence of the forming belts 10 and appropriately slightly spaced from the surfaces of the belts so as to avoid any drag from contact therewith.

The plastic, air-excluding dam or head 40 is started at the beginning of a sheet forming run by operating the extruder 23 sufficiently in advance of the sheet forming, running operation of the belts 10 to effect a sufficient accumulation of the fluid plastic in the trough 12 to serve as the plastic head 40. Thereupon, the rollers 11 are actuated to drive the belts 10 for plastic sheet formation. The rate of fluid plastic discharge from the orifice 33 is coordinated with the speed of travel of the belt 10 to maintain the excess plastic material forming the head 40 at a substantially constant volume to serve continuously during the operation as an atmosphere barrier.

Since the lip portions 38 of the nozzle are heated and the rolls 11 heat the belts 10, the plastic material which immediately surrounds the immersed portion of the nozzle and extends into the narrow spaces between the nozzle and the belts 10 maintains its fluidity and will thus not tend to solidify and be dragged down into the principal mass of the plastic dam or head 40 by the running belts 10 to suck air into the mass. Any of the fluid material of the head which adheres to and is drawn down by the belts 10 is instantaneously replaced without surging or bubbling, thus avoiding any entrapment of air that might be carried on detrimentally into the formed sheet.

As long as the rate of extrusion is properly controlled to maintain the head 40 at approximately a uniform height or at least maintaining the tip of the nozzle immersed, the atmosphere is effectively excluded from the extruded sheet-forming plastic and formation of the plastic sheet can be carried on continuously at high speed.

I claim as my invention:

1. The method of forming plastic sheet which comprises extruding fluid plastic material downwardly from a nozzle having its outlet within an upwardly opening trough formed by a pair of convergently related downwardly traveling forming surfaces, carrying the fluid plastic downwardly from the trough between said forming surfaces, and controlling the rate of extrusion of the material from the nozzle to maintain a head of the fluid plastic material extruded from the nozzle in said trough in excess of actual sheeting requirements and backed up about the nozzle from its outlet high enough to completely and continuously submerge the outlet to provide a complete barrier effectively excluding atmosphere from the outlet and the plastic material leaving the trough between the forming surfaces.

2. The method of forming plastic sheet between opposed endless belts running in unison and converging into sheet forming relation which comprises extruding toward the convergence of the belts from a nozzle outlet close to said convergence a mass of fluid plastic material before the belts are actuated, building up in said convergence by such extrusion and before the belts are set into motion a mass of the plastic material to a sufficient depth to immerse the nozzle outlet, and then setting the belts into sheet forming motion while continuing to extrude fluid plastic material toward said convergence at a rate coordinated with the speed of movement of the forming belts to maintain continuously said nozzle-immersing mass of plastic material.

3. The method of excluding atmosphere from the fluid plastic material extruded from a nozzle extending close to but spaced from the point of convergence of a pair of sheet forming belts moving in unison and with the nozzle in closely spaced relation to said belts, which comprises extruding the fluid material from the nozzle at a rate coordinated with the speed of movement of the belts for entirely filling with fluid plastic the space between the nozzle and the point of convergence and the spaces between the nozzle and the adjacent opposed portions of the belts at least near the outlet of the nozzle.

4. The method of excluding atmosphere from the fluid plastic material extruded from a nozzle extending close to but spaced from the point of convergence of a pair of sheet forming belts moving in unison and with the nozzle in closely spaced relation to said belts, which comprises entirely filling with fluid plastic the space between the nozzle and the point of convergence and the spaces between the nozzle and the adjacent opposed portions of the belts at least near the outlet of the nozzle, and maintaining the plastic material which fills said spaces constantly in a fluid state to avoid stiffening thereof.

5. In apparatus for forming plastic material into sheets, convergently disposed sheet forming belts, a plastic extrusion nozzle extending into the convergence of said belts but being disposed in spaced relation to said belts and the actual point of closest convergence thereof, and plates carried by the nozzle for closing the ends of the space between the discharge end of the nozzle and said point of convergence for retaining an atmosphere-excluding dam of plastic material in said convergence.

6. In the method of forming plastic sheet according to which fluid plastic material is delivered between opposed traveling forming surfaces moving away from a nozzle disposed close to but spaced from convergence of the surfaces to sheet forming spacing, the steps which comprise extruding fluid plastic material from the nozzle before the surfaces are set into sheet forming movement, continuing the extrusion before movement of the surfaces until a body of fluid plastic material has backed up in said space to cover the tip of the nozzle and exclude the same from the atmosphere, and thereafter setting the forming surfaces into sheet forming motion coordinated with the rate of extrusion of the plastic material to maintain the atmosphere-excluding mass of material while material is taken from the mass by the forming surfaces in the formation of the material into sheet but the atmosphere excluding mass remains substantially constant.

7. The method of forming sheet plastic between moving sheet forming surfaces traveling together in unison from a convergence providing an upwardly opening trough which comprises extruding thermoplastic material from an elongated narrow-slit nozzle depending within the trough to a limited spaced distance from the convergence of the forming surfaces, maintaining an extrusion pressure on the material to build and sustain a mass of plastic material backed up beyond the outlet of the nozzle so as to maintain said outlet immersed in the material and to exclude the atmosphere from the nozzle and the converging portions of the forming surfaces downwardly beyond the nozzle, heating the outlet of the nozzle, and heating the forming surfaces so as to maintain said mass of material constantly in a fluid state.

8. In apparatus for forming plastic material into sheets, convergently disposed continuously running sheet forming belts, a plastic extrusion nozzle extending into the convergence of said belts but being disposed in spaced relation to said belts and the actual point of closest convergence thereof, means for closing the ends of the space between the discharge end of the nozzle and said point of convergence for retaining an atmosphere-excluding dam of plastic material in said space, and means for forcing the material from the nozzle at a rate to back up around at least the outlet portion of the nozzle to provide the dam of plastic material.

9. In apparatus for forming thermoplastic material into sheet form, a pair of convergently disposed downwardly running sheet forming belts, the converging portions of the belts providing an upwardly opening trough therebetween and from the bottom of which the belts pass in closely spaced sheet forming relation downwardly, an elongated narrow-slit nozzle depending within the trough to a limited spaced distance from the convergence of the belts, means closing the ends of the space between the discharge end of the nozzle and the point of convergence and extending up from said discharge end, means cooperating with said nozzle for forcing thermoplastic material from the discharge slit of the nozzle at a rate to fill the lower portion of the trough and back up about the outlet portion of the nozzle to provide an atmosphere-excluding dam of the thermoplastic material about the discharge end of the nozzle, and heating means carried by the discharge end of the nozzle at each side of the slit outlet thereof for maintaining the plastic dam in a thermoplastic state.

GEORGE ALBERT LYON.

REFERENCES CITED

The following references are of record in the file of this patent:

UNITED STATES PATENTS

| Number | Name | Date |
| --- | --- | --- |
| 24,954 | Pomeroy et al. | Aug. 2, 1859 |
| 1,894,467 | Jacque | Jan. 17, 1933 |
| 2,097,290 | Parkin | Oct. 26, 1937 |
| 2,128,941 | Hudson | Sept. 6, 1938 |
| 2,249,507 | Van Derhoef | July 15, 1941 |

FOREIGN PATENTS

| Number | Country | Date |
| --- | --- | --- |
| 493,541 | Great Britain | 1947 |